Figure 1:
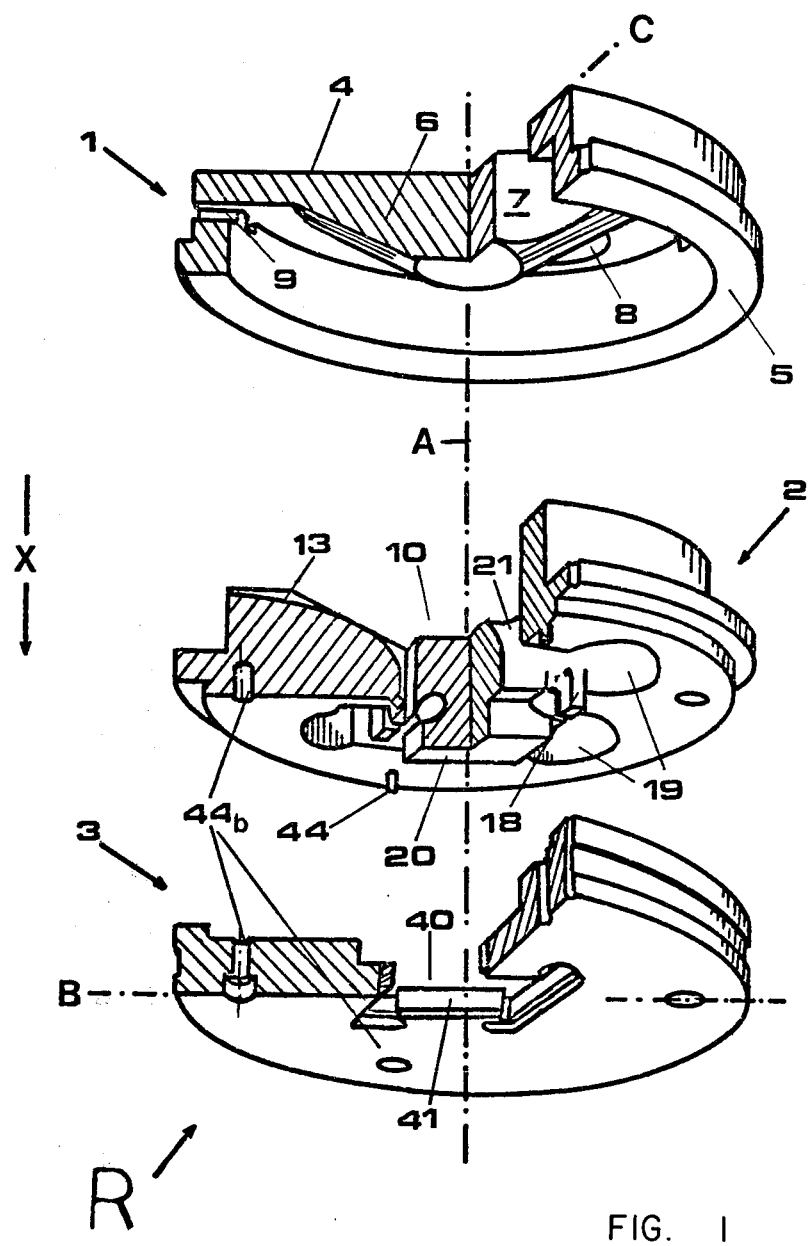

United States Patent [19]

Wagner et al.

[11] 4,005,255
[45] Jan. 25, 1977

[54] EXTRUDED COMPOSITE SECTION

[75] Inventors: Alfred Wagner, Steisslingen; Hermann Kidratschky, Hilzingen, both of Germany

[73] Assignee: Swiss Aluminium Ltd., Neuhausen am Rheinfall, Switzerland

[22] Filed: Apr. 4, 1975

[21] Appl. No.: 564,998

[30] Foreign Application Priority Data

Apr. 8, 1974 Germany .................. 7412358[U]

[52] U.S. Cl. .................. 174/126 CP; 29/191.6; 174/133 B; 191/22 DM; 191/29 DM
[51] Int. Cl.² .................................. H01B 5/02
[58] Field of Search .......... 29/191, 191.4, 191.6, 29/196.2, 197; 52/727, 731; 72/258; 191/22 DM, 22 R, 29 DM; 174/126 CP, 129 B, 133 B

[56] References Cited
UNITED STATES PATENTS

| 618,962 | 2/1899 | Stewart | 52/727 |
| 2,210,357 | 8/1940 | Beamont | 29/191 |
| 2,971,248 | 2/1961 | Kingsley | 29/197 |
| 3,372,007 | 3/1968 | Shaver | 29/191 |
| 3,686,081 | 8/1972 | Butter | 29/191.6 |
| 3,874,855 | 4/1975 | Legrand | 29/191.4 |

FOREIGN PATENTS OR APPLICATIONS

| 342,683 | 8/1936 | Italy | 191/22 |
| 327,567 | 7/1935 | Italy | 191/22 |
| 360,856 | 7/1938 | Italy | 191/22 |
| 45-32804 | 10/1970 | Japan | 191/22 DM |

Primary Examiner—C. Lovell
Assistant Examiner—Michael L. Lewis
Attorney, Agent, or Firm—Ernest F. Marmorek

[57] ABSTRACT

A composite section with a body mainly of light metal which has embedded in it inserts of a metal of higher strength. The inserts are not round in cross section and engage in the matrix by virtue of their shape.

8 Claims, 8 Drawing Figures

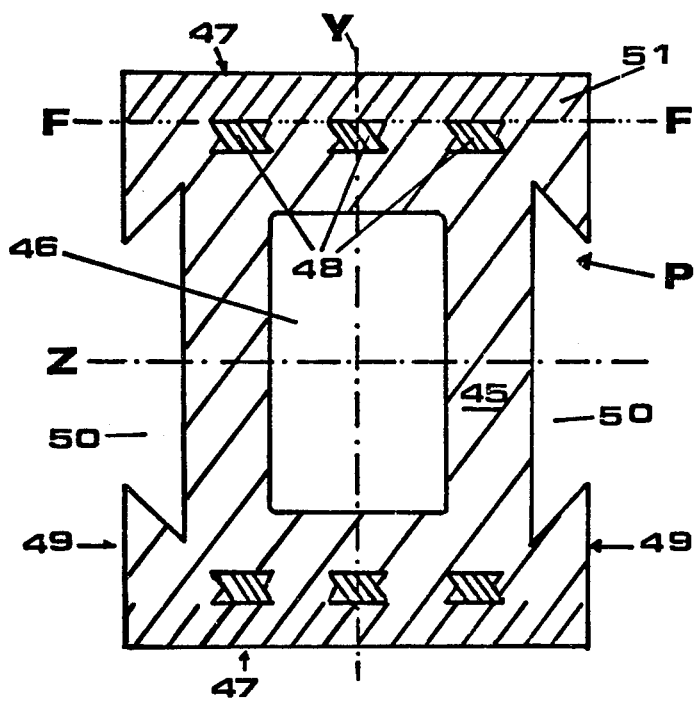
FIG. 6
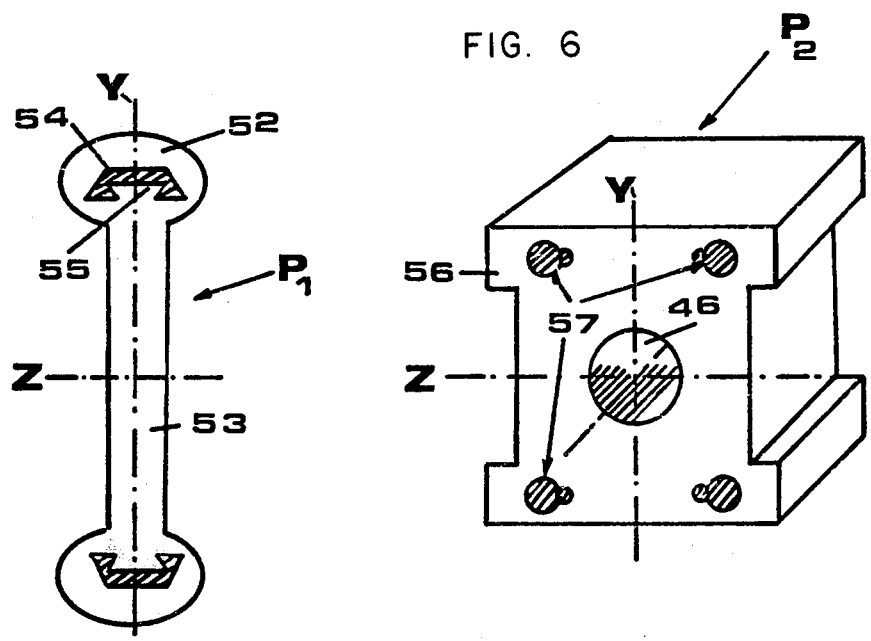
FIG 7
FIG. 8

EXTRUDED COMPOSITE SECTION

Reference is had to applicants co-pending patent application Ser. No. 561,239, filed Mar. 24, 1975. The invention concerns an extruded composite section with a body made chiefly of light metal which has incorporated in it inserts of high strength metal.

Such extrusions are known through the Auslegeschrift F 6231 (German patent application laid open) as light metal sections with inserts of steel wire. This composite section is produced by pushing zinc coated steel wire through screw-like channels, running around the main axis of the die, in the mandrel, to form an enclosed reinforcement net — the wires can also however be in straight lines.

There is the problem with this composite section that, while the bonding between the light metal matrix and the round steel wires can satisfy the requirements for reinforced structures, it is not adequate for the high loads in so-called sliding-contact-sections.

The aim of the inventor was therefore to overcome this disadvantage by the production of a new kind of section of the type described at the beginning.

As a solution to this problem what has been devised is an extruded composite section the inserts of which are not round in cross section and are embedded in the extrusion body in such a way that they engage with it. The manufacture of such an extrusion is possible only by means of a device with a die bearing, within which and at a distance from which the tapered ends of at least two feed-in channels for inserts are provided. These feed-in channels run approximately radially from the outer part of the die to the die bearings and terminate in this region approximately parallel to the axis of this region i.e. approximately parallel to the stream of metal being extruded.

In order to ensure a uniform thermal loading of the section during production and to have the possibility of a favourable mechanical loading by mechanical forces on the finished section it has been found particularly favourable to provide in the extrusion cross section at least one axis of symmetry on both sides of which the inserts are uniformly distributed.

So-called sections for sliding contact can in particular be manufactured in the manner described. Sections for sliding contact are chiefly conductor rails and constructional components the contact surface of which must be wear resistant. Useful here are composite sections with embedded cores of steel, copper or similar materials which in terms of the inventor are provided spaced apart in rows on the extrusion faces.

What is used by preference is a frame type of extrusion cross section with central channel and inserts embedded in two sides; the faces of the section subject to wear are worn down to the inserts which then resist further wear. In order to be able to accommodate effectively the forces which arise, the inserts must evidently be intimately connected with the matrix. Useful to this end, in terms of the invention, are the engaging profiles of the inserts e.g. dove tailed grooves etc.

Further advantages, features and details of the invention are presented in the following description of preferred embodiments of composite sections and the necessary extrusion dies for their manufacture. The following drawings assist to this end viz., FIG. 1: An explosive view of an extrusion die made up of a number of parts and showing some parts in section.

Figure 2:
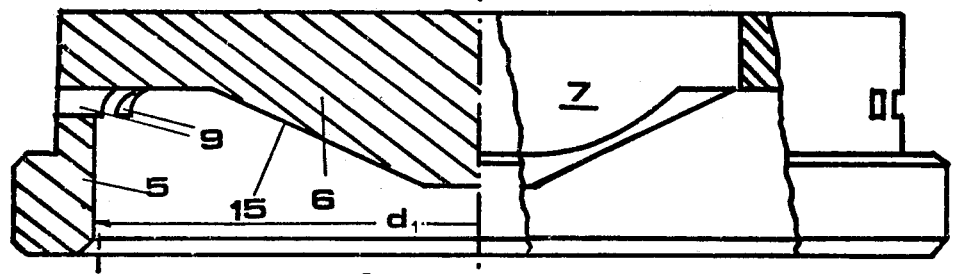
Figure 3:
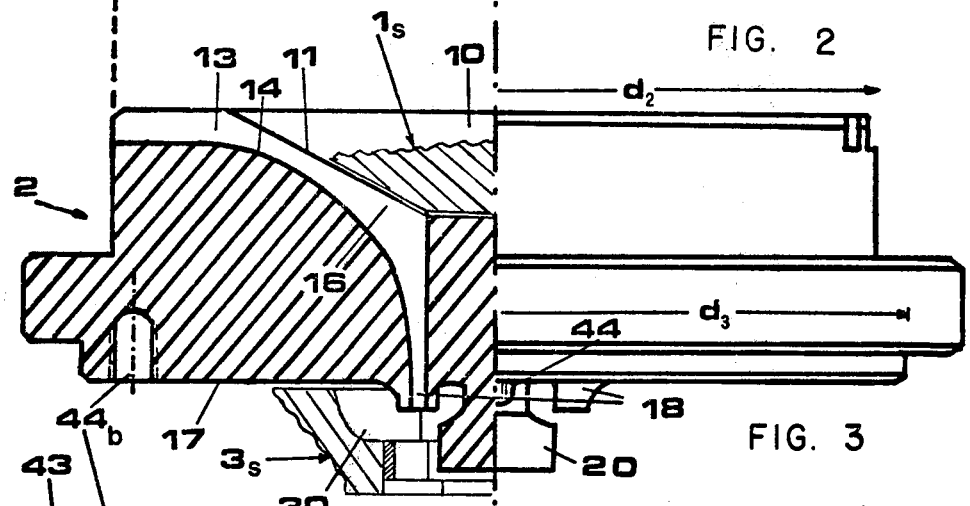
Figure 4:
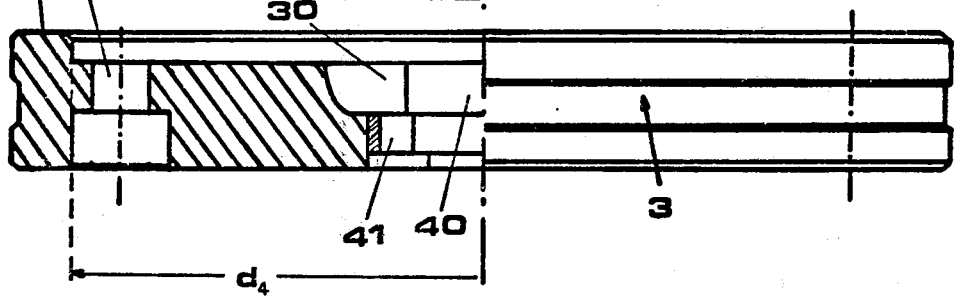

FIG. 2, FIG. 3, FIG. 4: Enlarged and partly sectioned views of the die shown in FIG. 1

Figure 5:
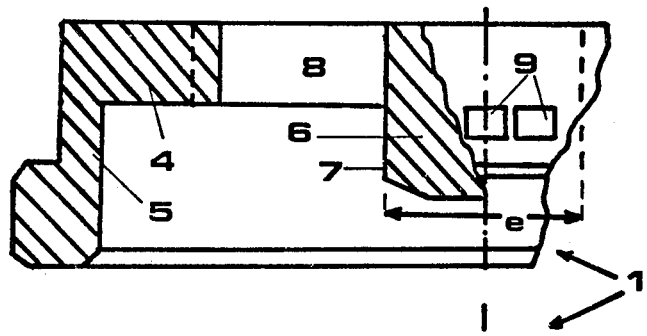

FIG. 5: A section along line C in FIG. 1

FIG. 6: An end view of the hollow section produced using the die shown in FIGS. 1 – 5

FIG. 7: Another form of extrusion in the form of an I-beam.

FIG. 8: Another hollow section with inserts.

A basically round extrusion die R for extruding composite sections exhibits, looking in the direction of extrusion, an entry plate 1, mandrel plate 2 to which a die plate 3 is fitted.

The entry plate 1 consists of a base 4 with surrounding collar 5 of inner radius $d_1$. The base 4 on the downstream side has a conical nose 6 and is cut on two sides parallel to the main axis A of the die R to produce approximately semi-oval faces 7. The latter are separated by a distance 'e' (FIG. 5) and each forms on either side of the conical nose a side wall to the holes 8 in the base 4.

In the region of the transverse axis B which is parallel to the faces 7 there are provided on each side of the conical nose 6, three openings 9 in the collar 5 which run parallel to the collar radii and which are limited on one side by the base 4.

Fitting on to the conical nose 6 of the entry plate 1 there is a corresponding conical recess 10 in the mandrel plate 2 in the wall 11 of which, on both sides of the axis A, there are cut three grooves 13 with convex curvature on the base 14; these grooves 13 connect up with the openings 9 in the entry plate 1 when parts 1 and 2 of the die are fitted together, and are covered as shown in detail is in FIG. 3, by the surface 15 of the conical nose 6 in such a way that they form curved channels 16 which, starting from the side openings 9 penetrate the mandrel plate 2 parallel to its axis and end at the bottom surface 17, as shown in the drawing here, as chimney-like tapered channels 18 of right angled cross-section. The holes 19 in the mandrel plate 2 also match up with the holes 8 in the base 4 of the entry plate 2.

The channels 18 flank the mandrel 20 in the mandrel plate 2, which provides a welding zone 30 when the die is assembled.

In the die plate 3 there is provided a central hole 40 with die bearing 41 which rests on the shoulders 21 of the mandrel 20 when the die is assembled.

As can be seen from FIGS. 2 – 4 the upper outer radius $d_2$ of the mandrel plate 2 is about equal to the inner radius $d_1$ of the entry plate 1 so that both die components 1 and 2 can be clamped together; in the same way the outer radius $d_3$ of the lower part of the mandrel plate 2 mates correspondingly to the inner radius $d_4$ of the collar ring 43 on the die plate 3. Additionally, the individual die components 1 – 3 are held together by bolts or screws which fit onto the holes 44 provided for this purpose.

During the extrusion of a billet of an aluminium alloy (not shown here) through the channels formed by the holes 8 in the entry plate 1 and the holes 19 in the mandrel plate 2, a number of inserts, made of steel for example, are fed into the side of the die R and passed down through the channels 16. The inserts glide along the walls of these channels and are made to turn through approximately 90° to run parallel to the main axis until they emerge from the described channels 18.

As a result of pressure on all sides in the welding zone 30, the inserts are surrounded by and bonded to the light metal which is being extruded and pass through without coming into contact with the die surface or the die bearing 41.

The product of the co-extrusion is a hollow composite section P with an aluminium body 45 having a central hollow channel 46 and on both of the narrow sides 47 three fully incorporated inserts 48 (see 18, FIG. 6) which are made for example of an abrasion resistant material. The aluminium body 45 forms in cross section a frame around a channel 46 and has a long axis of symmetry Y and perpendicular to this a short axis of symmetry Z.

On both long sides 49 of the frame there are provided recessed dove-tailed grooves 50 for engaging the section securely to supports (not shown).

Such sliding contact sections P are used mainly as conductor rails with abrasion resistant transfer surfaces. These abrasion resistant surfaces are exposed after the removal of the aluminium layer 49 up to the line F—F in FIG. 6.

Because of the symmetrical arrangement of the inserts 48 the composite section can also be used on both sides; if the sides are used in succession then the lifetime of such a conductor rail is doubled. The perfect embedding of the inserts 48 in the core prevents the possibility of contact corrosion; furthermore the inserts 48 can be coated, for example zinc on steel, as an additional protection from corrosion.

Similarly produced I-beam sections are shown in the other drawings and are section P, with strip inserts 54 in the leads 52 of a section web 53, in which the inserts 54 are provided with a dove-tailed groove 55 in the side facing the web 53, and also a hollow section $P_2$ with a central hole 46 and inserts 57 which are not round in cross-section in the flanges 56 of the section.

What we claim is:

1. An extruded composite section, suitable for use as an electrical conductor, comprising, in combination:
   a longitudinal body composed of an aluminum alloy; and
   at least one insert having non-circular cross section and being composed of a substance having a greater strength and wear-resistance than said aluminum alloy; said insert being disposed in said body with its periphery entirely surrounded by said aluminum alloy and extending throughout at least a major portion of the length of said body;
   said insert having a cross section for engaging said body securely.

2. The composite section as claimed in claim 1, wherein there are at least two of said inserts and said composite section possesses at least one axis of symmetry within its cross section.

3. The composite section as claimed in claim 1, wherein there are a plurality of said inserts disposed near opposite sides of said body and spaced in rows.

4. The composite section as claimed in claim 1, wherein said body has a frame-like hollow cross section and there are a plurality of said inserts disposed in rows near opposite sides of said body.

5. The composite section as claimed in claim 1, wherein there are a plurality of said inserts disposed in rows near two opposite sides of said body and another two opposite sides of said body each have a groove defined therein.

6. The composite section as claimed in claim 1, wherein said insert has a cross section including a dove-tailed type of notch.

7. The composite section as claimed in claim 1, wherein said insert includes at least one undercut groove.

8. The composite section as claimed in claim 1, wherein said insert comprises a plurality of sections welded together.

* * * * *